(12) United States Patent
Wang et al.

(10) Patent No.: US 8,983,512 B2
(45) Date of Patent: Mar. 17, 2015

(54) METHOD AND APPARATUS FOR TRANSMITTING MESSAGES

(75) Inventors: He Wang, Shanghai (CN); Yu Chen, Shanghai (CN); Zhongji Hu, Shanghai (CN); Yonggang Wang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 672 days.

(21) Appl. No.: 13/266,176

(22) PCT Filed: Apr. 28, 2009

(86) PCT No.: PCT/CN2009/000452
§ 371 (c)(1),
(2), (4) Date: Oct. 25, 2011

(87) PCT Pub. No.: WO2010/024412
PCT Pub. Date: Nov. 4, 2010

(65) Prior Publication Data
US 2012/0040603 A1    Feb. 16, 2012

(51) Int. Cl.
*H04B 7/00* (2006.01)
*H04B 15/00* (2006.01)
(Continued)

(52) U.S. Cl.
CPC .......... *H04L 12/1881* (2013.01); *H04L 63/107* (2013.01); *H04W 4/021* (2013.01);
(Continued)

(58) Field of Classification Search
CPC ..... H04W 36/026; H04W 4/02; H04W 4/021; H04W 72/005; H04B 7/2625; H04H 20/71; H04H 20/72; H04L 12/1881; H04L 63/107; H04L 67/325; H04L 67/14

USPC .............. 455/3.01, 3.02, 503, 524, 525, 463; 370/394
See application file for complete search history.

(56) References Cited

U.S. PATENT DOCUMENTS 7,751,305 B2 *  7/2010  Jung et al. ...................... 370/203
8,498,277 B2 *  7/2013  Lee et al. ....................... 370/338
(Continued)

FOREIGN PATENT DOCUMENTS

CN  101051864 A  10/2007
CN  101247315 A   8/2008
(Continued)

OTHER PUBLICATIONS

English Bibliography for PCT Pat. App. Publication No. WO 2008/139976 A1 published Nov. 20, 2008 in Japanese, printed from Thomson Innovation on Jun. 25, 2013, 3 pp.
(Continued)

*Primary Examiner* — Dominic E Rego
(74) *Attorney, Agent, or Firm* — Fay Sharpe LLP

(57) ABSTRACT

A method, a base station, a Multimedia Broadcast Multicast Service (MBMS) Coordination Entity (MCE), and a system for transmitting messages are provided. The method includes the steps of: defining a transmission order for different services in a service area; defining an arranging order of different messages in the same Transport Block (TB); generating and transmitting first messages carrying the transmission order for different services and the arranging order of different messages so as to synchronize contents of the first message TBs. According to the above technical solutions, the content synchronization of the MCCH RRC message TBs may be achieved.

20 Claims, 3 Drawing Sheets

(51) Int. Cl.
  *H04L 12/18* (2006.01)
  *H04L 29/06* (2006.01)
  *H04W 4/02* (2009.01)
  *H04W 72/00* (2009.01)
  *H04L 29/08* (2006.01)

(52) U.S. Cl.
  CPC ........... *H04W72/005* (2013.01); *H04L 67/325* (2013.01); *H04L 67/14* (2013.01); *H04W 4/02* (2013.01); *H04L 67/18* (2013.01)
  USPC ........................... 455/503; 455/524; 455/3.02

(56) References Cited

U.S. PATENT DOCUMENTS

| | | | |
|---|---|---|---|
| 2001/0022781 A1* | 9/2001 | Makipaa | 370/316 |
| 2002/0052198 A1* | 5/2002 | Savilaakso | 455/422 |
| 2004/0116125 A1* | 6/2004 | Terry | 455/450 |
| 2005/0114538 A1 | 5/2005 | Rose | |
| 2005/0271122 A1* | 12/2005 | Jonsson | 375/148 |
| 2007/0218930 A1* | 9/2007 | Kuo | 455/466 |
| 2008/0084837 A1* | 4/2008 | Watanabe et al. | 370/312 |
| 2008/0101334 A1 | 5/2008 | Bakker et al. | |
| 2008/0253322 A1 | 10/2008 | So et al. | |
| 2009/0130972 A1* | 5/2009 | Andersen et al. | 455/3.01 |
| 2009/0207810 A1* | 8/2009 | Petrovic et al. | 370/331 |
| 2009/0221314 A1* | 9/2009 | Hu et al. | 455/507 |
| 2010/0103923 A1 | 4/2010 | Nosley et al. | |
| 2010/0136987 A1* | 6/2010 | Kim et al. | 455/450 |
| 2010/0172281 A1 | 7/2010 | Hus et al. | |
| 2010/0178895 A1 | 7/2010 | Maeda et al. | |
| 2010/0189027 A1* | 7/2010 | Ishida et al. | 370/312 |

FOREIGN PATENT DOCUMENTS

| | | |
|---|---|---|
| CN | 101262626 A | 9/2008 |
| EP | 1622289 A2 | 2/2006 |
| JP | 2010507955 A | 3/2010 |
| JP | 2010520672 A | 6/2010 |
| JP | 2010530695 A | 9/2010 |
| WO | 2008052958 A2 | 5/2008 |
| WO | 2008109568 A1 | 9/2008 |
| WO | 2008139976 A1 | 11/2008 |
| WO | 2009004824 A1 | 1/2009 |

OTHER PUBLICATIONS

International Search Report for PCT/CN2009/000452 dated Jan. 21, 2010.
English Bibliography for PCT Patent Application Publication No. WO2009004824A1, published Jan. 8, 2009, printed from Thomson Innovation on Sep. 19, 2014, 5 pp.
English Bibliography for Chinese Patent Application Publication No. CN101247315A, published Aug. 20, 2008, printed from Thomson Innovation on Sep. 19, 2014, 4 pp.
English Bibliography for Japanese Patent Application Publication No. JP2010530695A, published Sep. 9, 2010, printed from Thomson Innovation on Sep. 19, 2014, 4 pp.
English Bibliography for Japanese Patent Application Publication No. JP2010507955A, published Mar. 11, 2010, printed from Thomson Innovation on Sep. 19, 2014, 4 pp.
English Bibliography forJapanese Patent Application Publication No. JP2010520672A, published Jun. 10, 2010, printed from Thomson Innovation on Sep. 19, 2014, 3 pp.

\* cited by examiner

METHOD AND APPARATUS FOR TRANSMITTING MESSAGES

FIELD OF THE INVENTION

The present invention relates to multicast broadcast service, and particularly to a method and an apparatus for transmitting messages.

BACKGROUND OF THE INVENTION

According to the further agreement on Multimedia Broadcast Multicast Service (MBMS) Point-to-Multipoint Control Channel (MCCH) in RAN#65bis in March 2009, MCCH is only mapped on Multicast Channel (MCH) in Rel9 eMBMS. It implies that there is a requirement to carry out Multicast Broadcast Single Frequency Network (MBSFN) transmission of MBMS Radio Resource Control (RRC) control signaling on MCH. It requires that different eNBs should have a consistent processing result for RRC signaling for MBMS to guarantee correct MBSFN transmission. This consistent processing result of RRC signaling includes content synchronization of MCCH RRC message Transport Blocks (TBs), exact transmission timing for MCCH messages, and uniform processing for RRC controlling signaling content for all eNBs when state of a service session changes. In order to achieve the multivendor interoperability, some mechanism and rules should be defined and standardized.

A basic transmission solution for MCCH RRC message is as shown in FIG. 6. It is assumed that the MCCH messages will be transmitted according to definitions of Modification Period (MP)/Repetition Period (RP) and all MCCH messages will be outputted within one TB. Transmission of an MCCH message only occurs in each MP and RP. The updating of MCCH messages only occurs at the starting point of each MP, and at a certain time point of each RP only the same MCCH message as in current MP is resent.

It is clear that the timing for transmission of MCCH RRC message TBs is defined and it is identical in different eNBs according to the same NIP and RP configuration. That means synchronization of the transmission timing for MCCH RRC message TBs is guaranteed.

The biggest issue to be resolved by the present invention is to design a mechanism to keep the content synchronization of all the MCCH RRC message TBs. At present, there is no such a solution in the prior art.

SUMMARY OF THE INVENTION

In order to resolve the above issues, embodiments of the present invention provide a method and an apparatus for transmitting messages.

According to an aspect of embodiments of the present invention, a method for transmitting messages is provided, including: defining a transmission order for different services in a service area; defining an arranging order of different messages in the same Transport Block (TB); generating and transmitting first messages carrying the transmission order for different services and the arranging order of different messages so as to synchronize contents of the first message TBs.

According to another aspect of embodiments of the present invention, a base station is provided, including: an interpreting unit configured to interpret a second message from a Multimedia Broadcast Multicast Service (MBMS) Coordination Entity (MCE) and extract therefrom a transmission order for different services in an MBMS Single Frequency Network area; a processing unit configured to define an arranging order of different messages in the same Transport Block (TB); and a message generating unit configured to generate first messages carrying the transmission order for different services extracted by the interpreting unit and the arranging order of different messages defined by the processing unit, so as to synchronize contents of the first message TBs.

According to a further aspect of embodiments of the present invention, a Multimedia Broadcast Multicast Service (MBMS) Coordination Entity (MCE) is provided, including: an order defining unit configured to define a transmission order for different services in an MBMS Single Frequency Network area; a transmitting unit configured to transmit to a base station a second message carrying the transmission order for different services defined by the order defining unit to assist the base station in synchronizing contents of the first message TBs, the first messages carrying the transmission order of different services and an arranging order of different messages in the same Transport Block (TB) defined by the base station.

According to another aspect of embodiments of the present invention, a system for Multimedia Broadcast Multicast Service (MBMS) is provided, including the above-mentioned base station and the MCE.

The above technical solutions can implement content synchronization of TBs of messages such as MCCH RRC messages.

BRIEF DESCRIPTION OF THE ACCOMPANYING DRAWINGS

Advantages of the present invention will become more apparent according to the following description with reference to the drawings, wherein.

DETAILED DESCRIPTION OF PREFERRED EMBODIMENTS

Embodiments of the present invention will be described in detail with reference to the figures.

With regard to an eNB, embodiments of the present invention provide a consistent MCCH RRC message processing mechanism based on the current protocol stack structure. A specific support is not required for M2, i.e., an MBMS Coordination Entity (MCE) generates and forwards messages without constraint/specific processing. However, in order to ensure that different eNBs can transmit identical MCCH RRC message TBs, some rules for the eNB that generates and transmits the MCCH RRC messages should be defined and standardized, wherein the MCCH message TBs are used for MBSFN transmission.

Figure 1:
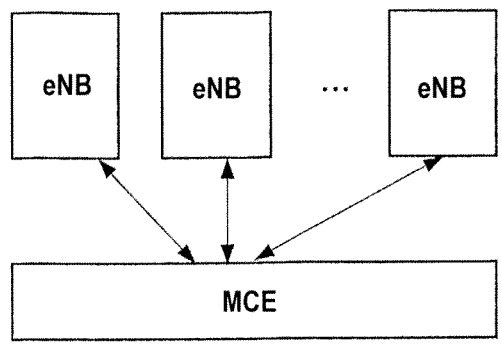
FIG. 1 illustrates a schematic view of a system for transmitting messages according to an embodiment of the present invention.

FIG. 1 illustrates a schematic view of a system for transmitting messages according to an embodiment of the present invention. As shown in FIG. 1, the system includes an eNB and an MCE as stated below.

Figure 2:
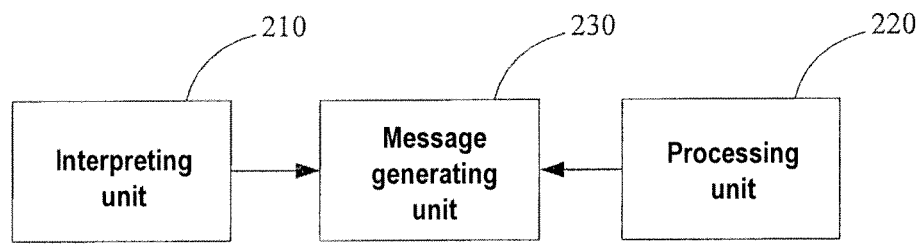
FIG. 2 illustrates a block diagram of a base station for transmitting messages according to an embodiment of the present invention.

FIG. 2 illustrates a block diagram of a base station (eNB) for transmitting messages according to an embodiment of the present invention. As shown in the figure, the base station includes an interpreting unit 210 configured to interpret the messages from the MCE and extract therefrom a transmission order for different services in an MBSFN area; a processing unit 220 configured to define an arranging order of different messages in the same TB; and a message generating unit 230 configured to generate messages carrying the transmission order for different services and the arranging order of different messages, so as to synchronize contents of the MCCH RRC message TBs.

The processing unit 220 may further be configured to, upon receipt of an instruction to stop a service session, remove radio bearer information of the service session at the beginning of next MP.

The processing unit 220 may further be configured to transmit the messages carrying the transmission order for different services and the arranging order of different messages according to the same activating timing.

The processing unit 220 may further be configured to, in the event of failing to receive an M2AP message, instruct to stop generation of the messages carrying the transmission order for different services and the arranging order of different messages, and mute the transmission of the updated TB until all necessary information of M2AP signaling is received correctly. The message generating unit 230 may further be configured to stop generation of the messages carrying the transmission order for different services and the arranging order of different messages according to the instruction.

Figure 3:
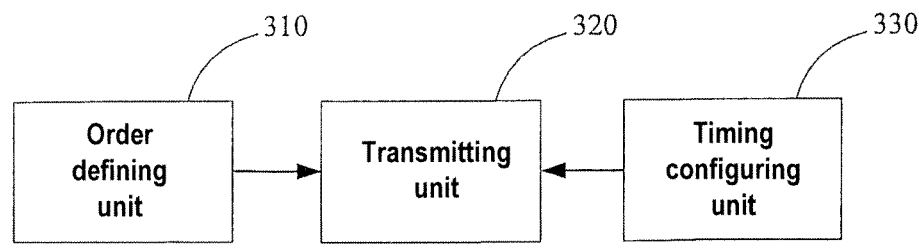
FIG. 3 illustrates a block diagram of an MCE for transmitting messages according to an embodiment of the present invention.

FIG. 3 illustrates a block diagram of an MCE for transmitting messages according to an embodiment of the present invention. As shown in FIG. 3, the MCE includes an order defining unit 310 configured to define a transmission order for different services in an MBSFN area a transmitting unit 320 configured to transmit messages carrying the transmission order for different services to assist eNBs in synchronizing contents of all the messages carrying the transmission order for different services and an arranging order of different messages in the same TB defined in the eNB.

The MCE further includes a timing configuring unit 330 for configuring an activating timing that may ensure that all the base stations may transmit the same message at the same MP time point. The transmitting unit 320 is further configured to inform all the base stations of the activating timing.

Although the base station and the MCE according to embodiments of the present invention are described in the form of discrete functional modules, each component shown in FIG. 2 and FIG. 3 may be implemented by a plurality of devices in practical application, and a plurality of components as shown may also be integrated in one chip or one apparatus in practical application. The base station and the MCE may also include any modules and devices for other purposes.

The method provided by embodiments of the present invention is described in connection with the above base station and MCE.

Figure 4:
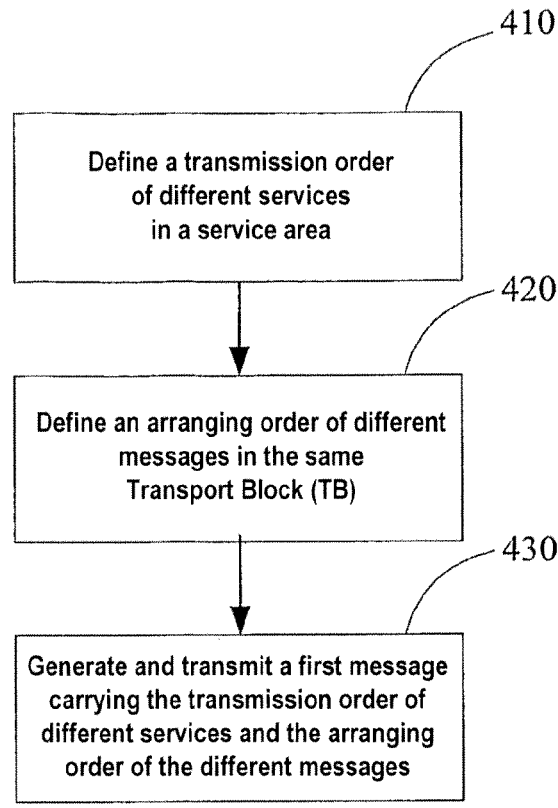
FIG. 4 illustrates a flowchart of a method for transmitting messages according to an embodiment of the present invention.

FIG. 4 illustrates a flowchart of a method for transmitting messages according to an embodiment of the present invention.

As shown in FIG. 4, in step 410, the order defining unit 310 of the MCE defines an order of different services in one MCCH RRC message.

In the embodiment of the present invention, the interpreting unit 210 of the eNB locally interprets the M2 Application Protocol (M2AP) messages from the MCE and assembles them into an MCCH RRC message. Each eNB should employ some rules when processing M2AP signaling, generating the MCCH RRC messages and transmitting MCCH message TBs, so as to keep content synchronization of the MCCH RRC message TBs.

The transmission order of all MBMS services in one MBSFN area is essential information for the eNB that schedules multiple MBMS services and the UE that receives MBMS services determined by the MCE. However, currently there is no explicit message to transfer this information. In the embodiment of the present invention, the transmission order of all MBMS services is implied by the order of service information carried in the M2AP signaling from the MCE. The MCCH RRC message should have a definite Information Element (IF) group for each service, including service ID, service state, MCS, MBSFN Subframe Allocation Pattern (MSAP) for respective services and etc. The definition of the IE group is defined in RRC protocol and is identical for each service. However, in the case of a plurality of services, the order of IE groups for each service would affect content of the MCCH RRC message. Utilization of different orders of IE groups for the same message among the eNBs will cause the content of the message different. At the same time, the order of these IE groups may imply the transmission order of all MBMS services in one MBSFN area.

Therefore, when the message generating unit 230 of the eNB generates the MCCH RRC messages, the order of IE groups for services should conform to the arranging order for services in the message received from the MCE, and the arranging order for services is identical for all eNBs.

For example, in one implementation, there are 3 services, S1, S2 and S3, simultaneously transmitted in one MBSFN area. The transmission order of the 3 services is decided by the MCE to be S2, S3 and S1. Then when the MCE transfers the control information for the 3 services to the eNB via an M2 interface, the order of the control information for each service is arranged in the order of S2, S3, S1, which implies the transmission order of the three services. When the eNB receives the M2AP signaling from the MCE and generates the MCCH RRC messages, order of the IE groups should also conform to this order from the MCE, namely, S2, S3, S1. Since the same order is employed, all the eNBs may get the consistent result for each MCCH RRC message to guarantee the consistence of contents of the MCCH RRC messages.

In step 420, the processing unit 220 of the eNB defines an arranging order of different messages in the same TB.

As stated above, there are multiple MCCH messages of MBMS signaling and these MCCH messages are simultaneously transmitted in one TB at a certain time point of MP or RP. If the contents of each MCCH message are identical, the order of MCCH messages in the MCCH RRC message TBs generated in different eNBs would affect the content consistence of the MCCH RRC message TBs generated in different eNBs. Therefore, it is necessary to define the order of MCCH RRC messages in one TB, i.e. in the MCCH message TB which message should be arranged first, which second, and so on, and this need to be standardized.

For example, in one implementation, there are three MCCH RRC messages which are "MBMS Modified Service Information", "MBMS Unmodified Service Information" and "Current Cell PTM RB Information". These three messages in one TB should be arranged in a fixed pattern that indicates the order of these three messages. For example, the first one is "MBMS Modified Service Information", the second one is "MBMS Unmodified Service Information" and the third one is "Current Cell PTM RB Information". According to this predetermined arranging order rules, all involved eNBs will have the consistent result of the order of messages in one TB.

In step 430, the message generating unit 230 of the eNB generates the MCCH RRC messages, wherein the MCCH RRC messages carry the transmission order for different services determined in step 410 and the arranging order of different messages in the same TB determined in step 420. As for each eNB, the arranging order of all the messages in the TB and the content of each message (e.g., which service is related) are both determined, therefore the content synchronization of the MCCH RRC message TBs is achieved for different eNBs.

In addition, embodiments of the present invention may further perform consistent processing on changes of the MCCH messages in the eNB.

When one service session terminates, the RB information of this service would become invalid. The processing unit 220 of the eNB may remove the RB information for this service from the related MCCH RRC messages. However, this requires all the eNBs performing consistent processing to remove the RB information of this terminated service. Then the contents of subsequent MCCH RRC messages could keep the same for different eNBs. The basic rules for this issue are as follows.

According to definitions of MP/RP, when an instruction for stopping the service session is sent in this MP, the processing unit 220 of the eNB removes the RB information of the specific service at the beginning of next MP.

In addition, embodiments of the present invention may further be used to handle different transmission delays of M2 messages for different eNBs.

The transmission times of M2AP singling from the MCE to different eNBs are different due to different routes. Another case is that the same M2AP message is correctly received by different eNBs via different M2 retransmission procedures. This results in that different eNBs may receive the M2AP messages at different timings. In order to achieve correct MBSFN transmission of MCCH RRC messages, all involved eNBs are required to transmit the same MCCH RRC message TB at the same time in despite of the different receiving timings of the same M2AP signaling in different eNBs.

In order to resolve the issue that different eNBs may receive the M2AP messages at different timing due to delay or M2 retransmission, the processing units 220 of all the eNBs should transmit related MCCH RRC messages according to the same activating timing which is configured by the timing configuring unit 330 of the MCE in the M2AP messages. This activating timing takes into account the delay variation over the M2 interface and some redundancy, which may guarantee all the eNBs may transmit the same RRC MCCH message at the same MP time point. The processing unit 220 of the eNB should determine the next MP time point closest to this activating timing as the MP time point for transmission of MCCH RRC message TBs.

Additionally, embodiments of the present invention may also handle abnormal instance when the eNB does not receive the M2AP signaling correctly in time.

If the processing unit 220 of the eNB discovers failure reception of an M2AP message, it should instruct to stop the generation of MCCH RRC messages and shall mute transmission of the updated MCCH RRC message TBs until all the necessary information of M2AP signaling is received correctly. The message generating unit 230 stops the generation of the MCCH RRC messages according to the instruction of the processing unit 220.

Figure 5:
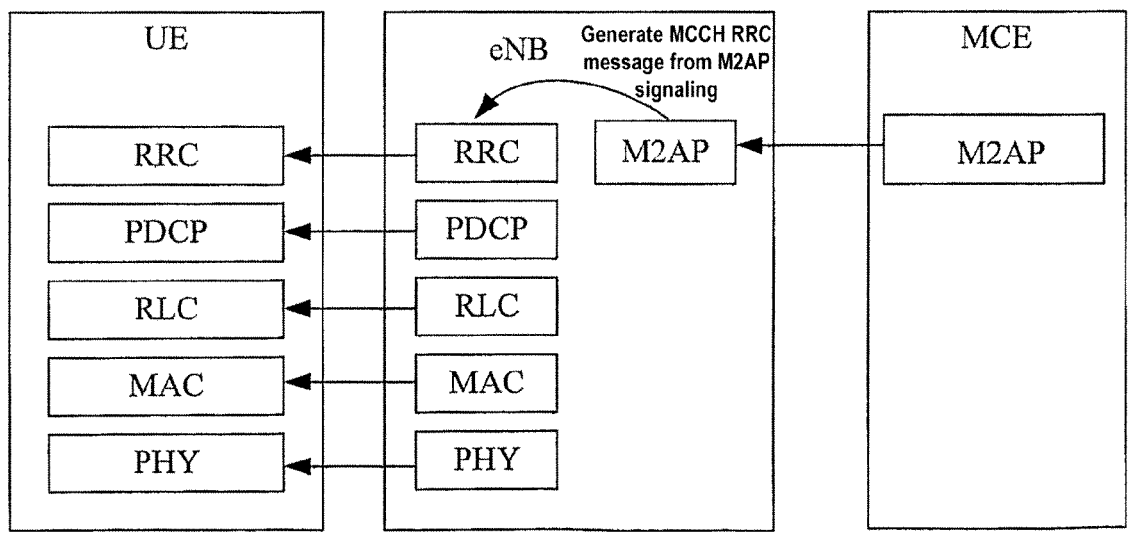
FIG. 5 illustrates a schematic view of a basic protocol stack structure according to an embodiment of the present invention.
Figure 6:
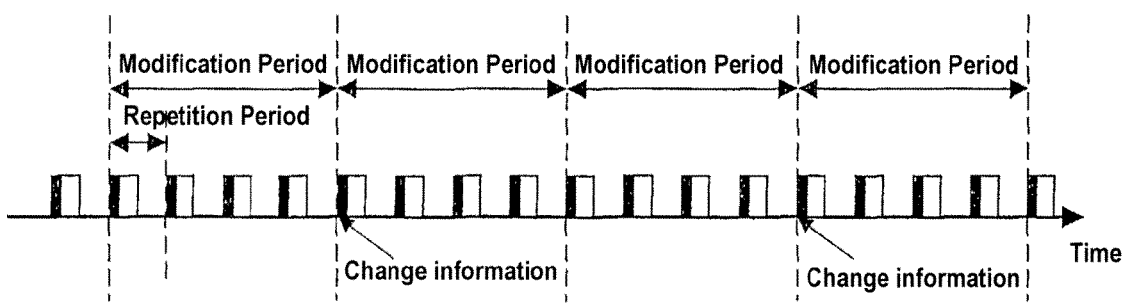
FIG. 6 illustrates a schematic view of a basic transmission solution for MCCH RRC messages in the prior art.

FIG. 5 illustrates a schematic view of a basic protocol stack structure according to an embodiment of the present invention. As shown in FIG. 5, the eNB extracts desired information from the M2AP signaling sent from the MCE to generate the MCCH RRC messages, thereby achieving the content synchronization of TBs of the MCCH RRC messages between all the eNBs and UEs. PDCP, RLC, MAC and PHY in FIG. 5 are used for other communications between the eNB and the UE.

According to the above technical solutions, the content synchronization of the MCCH RRC message TBs may be achieved and maintained.

Those skilled in the art may readily appreciate that different steps of the above method may be performed by a programming computer. In this context, some embodiments are intended to cover machine-readable or computer-readable program storage devices such as digital data storage medium and programmed machine-executable or computer-executable program instructions, wherein these instructions perform some or all of the steps of the above method. The program storage medium, for example, may be digital storage, magnetic storage medium (such as magnetic disk or magnetic tape), hard disk driver, or optical readable digital data storage medium. The embodiments are also intended to cover a computer programmed to execute steps of the above method.

The above description and figures only illustrate principles of the present invention. Therefore, it should be appreciated that those skilled in the art may propose different structures that reflect the principles of the present invention and are within the spirit and scope of the present invention, although these different structures are not explicitly described or indicated herein. Besides, all the examples mentioned herein are definitely mainly used for teaching purpose and assist readers in understanding the principles of the present invention and concepts conceived by the inventor and promoting progress of the field, and should not be interpreted as limiting these particularly-mentioned examples and conditions. Besides, statements of the principles, aspects and embodiments of the present invention and specific examples thereof as mentioned herein include their equivalents. The above description is only for implementing the embodiments of the present invention. Those skilled in the art should appreciate that any modifications or partial substitution without departure from the scope of the present invention all fall within the scope defined by the appended claims of the present invention. Therefore, the scope of protection of the present invention shall be subjected to the protection scope of the appended claims.

What is claimed is:

1. A method for transmitting messages, comprising:
defining a transmission order for different services in a service area associated with a coordination entity and multiple base stations, wherein the multiple base stations include a first base station and at least one other base station;
defining an arranging order of different subsequent messages broadcast by the first base station in a Transport Block (TB) for a first message; and
generating and transmitting the first message carrying the transmission order for the different services and the arranging order of the different subsequent messages, so as to synchronize contents of the TB of the first message with contents of TBs of corresponding messages broadcast by the at least one other base station.

2. The method according to claim 1, wherein the coordination entity includes a Multimedia Broadcast Multicast Service (MBMS) Coordination Entity (MCE), the method further comprising:
determining the transmission order for the different services at the MCE and carrying the transmission order in a second message for transmission to the multiple base stations; and
extracting the transmission order for different services from the second message at the first base station.

3. The method according to claim 2, further comprising:
in the event of failing to receive the second message at the first base station, stopping the generation of the first message and muting the transmission of the first message until the second message is received.

4. The method according to claim 1, further comprising:
after an instruction for stopping a service session is received by the first base station, removing Radio Bearer (RB) information for the service session at a beginning of a next Modification Period (MP).

5. The method according to claim 1, further comprising:
transmitting the first message from the first base station and the corresponding messages from the at least one other base station according to a same activating timing such that the multiple base stations transmit the first message and the corresponding messages at a same MP time point.

6. The method according to claim 5, further comprising:
configuring, by the MCE, the activating timing based on a delay variation over an M2 interface and redundancy.

7. The method according to claim 6, further comprising:
determining, by the first base station and the at least one other base station, a next MP time point closest to the activating timing as the MP time point for transmitting the first message and the corresponding messages.

8. The method according to claim 1, wherein the service area is a Multicast Broadcast Single Frequency Network (MBSFN) area.

9. A first base station, comprising:
an interpreting unit configured to interpret a second message from a Multimedia Broadcast Multicast Service (MBMS) Coordination Entity (MCE) and extract therefrom a transmission order for different services in a Multicast Broadcast Single Frequency Network (MBSFN) area associated with the MCE and multiple base stations, wherein the multiple base stations include the first base station and at least one other base station;
a processing unit configured to define an arranging order of different subsequent messages broadcast by the first base station in a Transport Block (TB) for a first message; and
a message generating unit configured to generate the first message carrying the transmission order for the different services extracted by the interpreting unit and the arranging order of the different subsequent messages defined by the processing unit, so as to synchronize contents of the TB of the first message with contents of TBs of corresponding messages broadcast by the at least one other base station.

10. The first base station according to claim 9, wherein the processing unit is further configured to remove Radio Bearer (RB) information for the service session at a beginning of a next Modification Period (MP) after an instruction for stopping a service session is received from the MCE.

11. The first base station according to claim 9, wherein the processing unit is further configured to transmit the first message according to a same activating timing that the corresponding messages are transmitted from the at least one other base station such that the multiple base stations transmit the first message and the corresponding messages at a same MP time point.

12. The first base station according to claim 11, wherein the MCE is configured to configure the activating timing based on a delay variation over an M2 interface and redundancy.

13. The first base station according to claim 12, wherein the processing unit is configured to determine a next MP time point closest to the activating timing as the MP time point for transmitting the first message.

14. The first base station according to claim 9, wherein the processing unit is further configured to, in the event of failing to receive the second message, instruct the message generating unit to stop generation of the first message and mute the transmission of the first message until the second message is received.

15. A Multimedia Broadcast Multicast Service (MBMS) Coordination Entity (MCE), comprising:
an order defining unit configured to define a transmission order for different services in a Multicast Broadcast Single Frequency Network (MBSFN) area associated with the MCE and multiple base stations, wherein the multiple base stations include a first base station and at least one other base station; and
a transmitting unit configured to transmit a second message to the multiple base stations, the second message carrying the transmission order for the different services defined by the order defining unit to assist the multiple base stations in synchronizing contents of a transport block (TB) of a first message broadcast by the first base station with contents of TBs of corresponding messages broadcast by the at least one other base station, the TBs of the first message and corresponding messages carrying the transmission order for the different services and an arranging order of different subsequent messages to be broadcast by the multiple base stations, wherein the arranging order of the different subsequent messages is defined by the corresponding base station.

16. The MCE according to claim 15, further comprising:
a timing configuring unit configured to configure an activating timing such that the multiple base stations transmit the first message and the corresponding messages at a same Modification Period (MP) time point, and
wherein the transmitting unit is further configured to inform the multiple base stations of the activating timing.

17. The MCE according to claim 16 wherein the timing configuring unit is configured to configure the activating timing based on a delay variation over an M2 interface and redundancy.

18. The MCE according to claim 15, wherein the multiple base stations are configured to extract the transmission order for different services from the second message.

19. The MCE according to claim 15, wherein, in the event of failing to receive the second message, the first base station is configured to stop generation of the first message and configured to mute transmission of the first message until the second message is received.

20. A system for Multimedia Broadcast Multicast Service (MBMS), comprising
the first base station according to claim 9 and
the MCE associated with the MBSFN area, the MCE comprising:

an order defining unit configured to define the transmission order for the different services in the MBSFN area, and a transmitting unit configured to transmit the second message to the multiple base stations, the second message carrying the transmission order for different services defined by the order defining unit to assist the multiple base stations in synchronizing contents of the TB of the first message broadcast by the first base station with contents of TBs of corresponding messages broadcast by the at least one other base station, the TBs of the first message and corresponding messages carrying the transmission order for the different services and the arranging order of the different subsequent messages to be broadcast by the multiple base stations, wherein the arranging order of the different subsequent messages is defined by the corresponding base station.

* * * * *